United States Patent [19]

Wior

[11] E Patent Number: Re. 33,406

[45] Reissued Date of Patent: Oct. 30, 1990

[54] SWIMSUIT

[75] Inventor: Carol W. Wior, Los Angeles, Calif.

[73] Assignee: The WIOR Corporation, Los Angeles, Calif.

[21] Appl. No.: 160,215

[22] Filed: Feb. 25, 1988

Related U.S. Patent Documents

Reissue of:

[64] Patent No.: 4,571,742
Issued: Feb. 25, 1986
Appl. No.: 749,895
Filed: Jun. 28, 1985

[51] Int. Cl.[5] ..... A41D 7/00
[52] U.S. Cl. ..... 2/67; 2/69
[58] Field of Search ..... 2/67, 69

[56] References Cited

U.S. PATENT DOCUMENTS

| | | | |
|---|---|---|---|
| 1,890,507 | 12/1932 | Gifford | 2/67 |
| 2,033,456 | 3/1936 | Cunningham | 2/67 |
| 2,097,777 | 11/1937 | Rothman | 2/67 |
| 2,120,173 | 6/1938 | Cohen | 2/67 |
| 2,157,784 | 5/1939 | Cohen | 2/67 |
| 2,279,222 | 4/1942 | Bowman | 2/67 |
| 2,341,032 | 2/1944 | Freed | 2/67 |
| 2,341,596 | 2/1944 | Cobb | 2/72 |
| 2,428,175 | 9/1947 | Norton | 2/67 |
| 2,535,018 | 12/1950 | Reid | 2/67 |
| 2,595,088 | 4/1952 | Licht | 2/256 |
| 2,605,469 | 8/1952 | Licht | 2/255 |
| 3,036,574 | 5/1962 | Jeffrey | 2/67 |
| 3,134,994 | 6/1964 | Christofferson | 2/67 |
| 3,392,730 | 7/1968 | Relli | 2/67 X |
| 3,771,172 | 11/1973 | Barg | 2/67 |
| 4,372,320 | 2/1983 | Sibler | 128/455 |

*Primary Examiner*—Werner H. Schroeder
*Assistant Examiner*—Jeanette E. Chapman
*Attorney, Agent, or Firm*—Nilssson, Robbins, Dalgarn, Berliner, Carson & Wurst

[57] ABSTRACT

A swimsuit for ladies designed with an inner figure-controlling liner garment and an outer single ply bathing garment. The inner and outer garments, formed of elastic materials, are sewn separately along their common perimeters. The inner garment is smaller than the outer garment with greater lateral than vertical stretch for freedom of movement. Secured to the upper edge of the inner liner is a set of arcuate stays which are attached at their ends only to the inseam of the outer garment. The stays support the breasts and lift them upwardly and outwardly against the outer garment for an enhanced but natural appearance.

18 Claims, 1 Drawing Sheet

FIG. 1
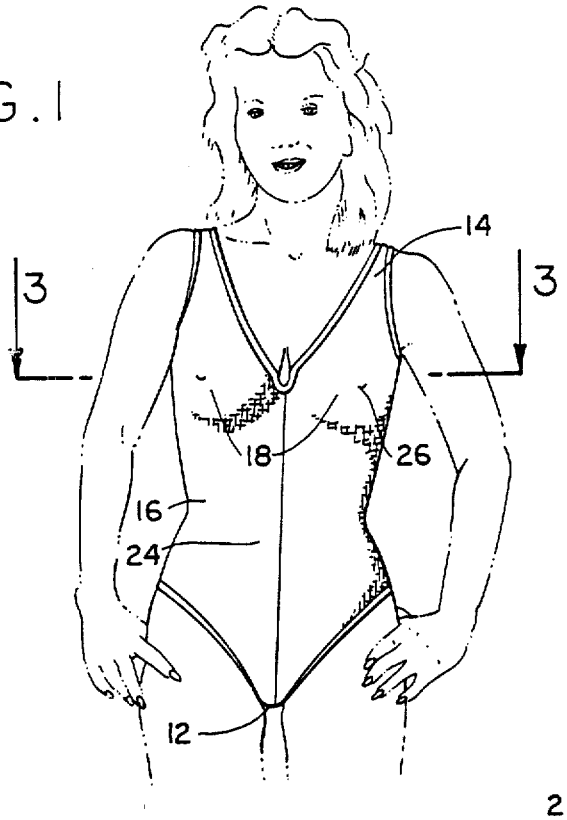
FIG. 2
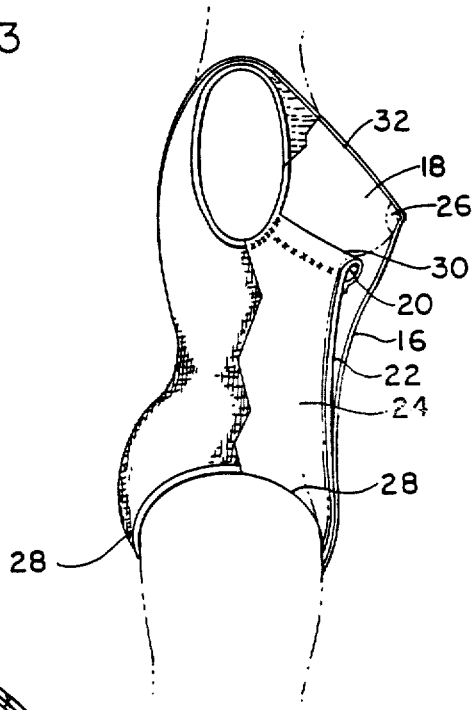
FIG. 3
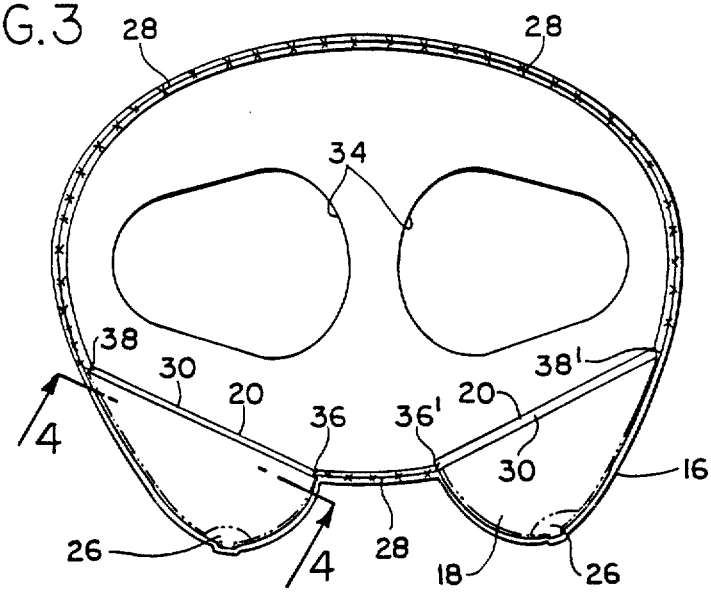
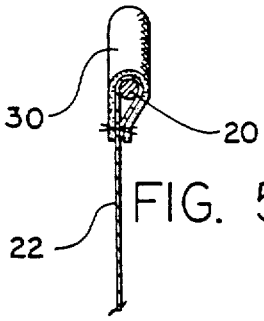
FIG. 5
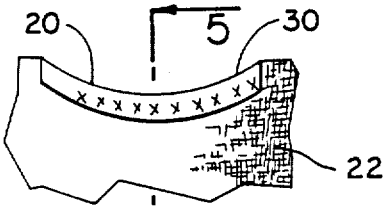
FIG. 4
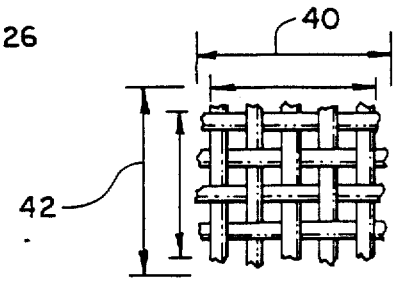
FIG. 6

SWIMSUIT

Matter enclosed in heavy brackets [ ] appears in the original patent but forms no part of this reissue specification; matter printed in italics indicates the additions made by reissue.

FIELD OF THE INVENTION

This invention relates to swimsuits and particularly to women's swimsuits having a stretchable inner liner and outer bathing suit.

BACKGROUND AND SUMMARY OF THE INVENTION

Swimwear has evolved over the years from garments which primarily functioned to preserve the modesty of the bather to clothing which permits exposure to the limits of public decency. A natural consequence of this evolution is that consumer demands concerning swimsuits, especially from women, require that the suit enhance and highlight the more appealing aspects the female silhouette.

In order to enhance one's appearance while wearing a swimsuit, clothing designers have designed swimsuits with an outer garment covering an inner liner made from a spandex material. U.S. Pat. No. 3,771,172 discloses a swimsuit having an inner garment which completely engirdles the body, formed by a spandex-type material, and an outer garment which performs no figure control function. The inner garment is in part elastic and acts to firm up the stomach and otherwise perform a figure control function. This same inner liner presses against the chest and tends to flatten out a woman's figure, a result that often is not desirable. Additionally, stress to the fabric of the liner may be greater in a vertical direction after the wearer bends over or sits down. This additional stress on the liner tends to cause the liner's figure control function to diminish.

U.S. Pat. No. 2,605,469 attempts to deal with the problem of achieving figure control with an elastic liner while causing the breasts to uplift. This patent provides breast cups reinforced by arcuate braces to support the woman's breast. The brace-reinforced breast cups serve as a brassier and may be padded. Such a system may be useful in foundation garments worn under a dress, but are too bulky for a swimsuit.

Bust supporting devices are disclosed in U.S. Pat. Nos. 1,890,507 and 2,428,175. Both discloses exhibit independent means, without any elastic inner liner, for lifting the breasts, but do not function in conjunction with any figure control function.

U.S. Pat. No. 2,279,222 attempts to provide a snug form fitting suit with front panels for supporting the breasts. The front inner liner covers the breast and is sewn within the outer garment perimeter. Such design supports the breast, but restricts the natural appearance of upper body movement.

As fashion in swimwear moves towards greater exposure of the body, women have required that such garments display their physical attributes in the most flattering light possible. Ideally, swimwear must allow freedom of movement, give a natural appearance, but direct the curvature of one's silhouette in a flattering fashion. The present invention achieves this goal by providing a swimsuit design comprising an inner liner which engirdles the figure and flattens out abdominal bulge, but which does not flatten the breast curvature.

The breasts are supported in a manner emphasizing an "au naturelle" appearance.

More particularly, the present invention comprises an inner liner garment of elastic contruction and material which serves primarily to insure figure control. The liner is generally made from elastic material such as spandex and engirdles the torso. The stretch of the spandex is designed to be greater in the lateral direction than in a vertical direction, allowing ease of movement, for example, when bending over. The liner is tighter and smaller than the outer garment, and is sewn to the outer garment along their common perimeters. The outer bathing garment is a single ply of elastic construction covering the loin as well as the area of the breasts. The outer garment is free from padding and may be sewn to form a one-piece construction which joins a front breast covering portion to a back panel by a pair of adjustable shoulder straps.

The top edge of the inner liner meets the underside of the breast. Only the corners of this breast bordered edge are sewn to the outer garment; most of the upper edge of the inner liner is not sewn to the outer garment. Along the top arcuate edge of the inner liner, stays are securely disposed to form a supporting arc to hammock and uplift the breasts. The arcuate stays are passed into a pair of sheaths, each sheath bordering the underside of a breast. The sheaths are padded along their length to form a cushioned material for contacting the underside of the breasts. In such a manner, the inner liner drives unwanted abdominal bulges upwardly to supplement the breast curvature, while the breasts remain free from the confinements of the inner liner and are thrust upward and outward against the outer liner, hammocked by the arcuate stays of the inner liner edge, pressing outwardly and freely for a flattering natural appearance.

BRIEF DESCRIPTION OF THE DRAWINGS

FIG. 1 is a perspective frontal view of the bathing suit as worn by a female drawn in phantom;

FIG. 2 is a side elevational view, partially fragmented showing the internal and external structure of the swimsuit;

FIG. 3 is a cross sectional planar view of the swimsuit taken along line 3—3 of FIG. 2.

FIG. 4 is a view of a sheathed stay, taken along line 4—4 of FIG. 3;

FIG. 5 is an enlarged cross-sectional view of a sheathed stay, taken along the line 5—5 of FIG. 4; and FIG. 6 is an enlarged view, of what would be observed if the fabric of the liner were magnified. FIG. 6 is illustrative of the unique stretching characteristics of the spandex inner liner.

DETAILED DESCRIPTION OF THE PREFERRED EMBODIMENT

A detailed illustrative preferred embodiment of the present invention is disclosed herein. The preferred embodiment is directed towards a swimsuit having an outer garment of a one piece, unibody construction It should be noted that there may be alternative equivalent embodiments of the swimsuit disclosed herein.

Referring to FIG. 1, a front elevational view of the bathing suit 10 as worn by a female figure (in phantom) is shown generally. The bathing suit 10 covers the entire torso, incuding the loins and breasts from the crotch 12 to the upper chest area 14. (As used in this disclosure, the term "torso" is that portion of a woman's body which, minimally, is generally covered by clothing when one appears in public. The torso is the minimal area that must be covered to comport with contemporary standards of public decency. The outer garment 16 is a single ply elastic material which covers the breasts 18. The breasts 18 are uplifted by arcuate stays 20 (FIGS. 2–4) not visible through the outer garment 16. The outer garment 16 follows the contour of the female form as controlled and enhanced by the inner liner 22. The abdomen 24 retains a slender appearance while the breasts 18 are free from confinement due to the figure control function of the inner liner 22. The outer garment 16 has no padding over the breasts 18 and allows breast nipples 26 to be pressed against the outer garment 16 giving a natural appearance.

Turning now to FIG. 2, a cut away side elevational view of the phantom figure reveals the operation of the inner liner 22. The inner liner 22 is sewn along the perimeter 28 of the outer garment 16 into the swimsuit 10. At the upper front edge, the inner liner is curled to form a sheath 30. The sheath 30 forms a sleeve for securing the arcuate stays 20 under the breasts 18. The sheath 30 of the inner liner 22 is sewn to the outer garment 16 only at each end of each sheath 30; along most of its length, the sheath 30 is not secured to the outer garment 16. When a women puts on the swimsuit 10, her breasts 18 come to rest just above the sheath 30 and are supported by the arcuate stays 20. While the abdomen 24 is slenderized to an appealing look by the form fitting function of the inner liner 22, the arcuate stay 20 acts to hammock the breasts 18, lifting the breasts 18 gently upwardly. The breasts 18 protrudes forward in a comfortable snug fit at 32 against the single ply outer garment 16. The nipples 26 caress the inner side of the outer garment 16, allowing the female silhouette to be displayed in a natural manner. Any excess bulge is also pressed upward from the abdomen 24 to enhance the appearance of the breasts 18. The inner liner 22 is constructed of a somewhat smaller size than outer garment 16 in order that the inner liner 22 is able to perform its form fitting function.

FIG. 3 is a cross sectional view of the torso of the female phantom figure. Leg cavities are shown at 34. The perimeter 28 of the swimsuit 10 shows the manner in which the inner liner is hemmed to the outer liner. The arcuate stays 20 are nestled within the sheaths 30. The sheaths 30 are sewn only at their end points 36, 36', 38 and 38'. In such a manner, the entire length of the sheath 30 may hang free to hammock the breasts 18. The breasts 18 are thrust upward and forward against the resilient outer garment 16. The outer garment 16 follows the contour of the natural human form, outlining the nipples 26.

The shape of the arcuate stay is shown in FIG. 4 and its construction is shown in FIG. 5. The stay is formed of a curved flat metal strap and is encased in cloth which is padded, where it will be in contact with the breasts.

FIG. 6 illustrates the design of the inner liner 22. The horizontal stretch 40 is greater than the vertical stretch 42 so that in a stretched condition, the vertical stretch 42 of the inner liner 22 is 110% of the relaxed state of the material, while the horizontal stretch of the spandex material 40 is 120% of the relaxed state. This difference in stretch allows freedom of movement, particularly when the female wearing the swimsuit 10 needs to bend over. With such a construction, the improved swimsuit 10 is a natural figure controlled and form fitting swimwear garment which allows the wearer flexible and free movement.

The scope of the invention is not necessarily limited to the preferred embodiment which has been described. Other embodiments and variations will occur to those skilled in the art. Many structural changes are possible, and those changes are intended to be within the scope of this disclosure. For example, other materials besides Spandex may be useful to impart eleastic and resilient characteristics. The arcuate stay may be made from metal or synthetic, rigid plastic. These variations illustrate that it is to be understood that the foregoing drawings and specifications merely are illustrative and describe the preferred embodiment of the invention, ings and specifications merely are illustrative and describe the preferred embodiment of the invention, and that other embodiments are contemplated to be within the scope of the appended claims.

I claim:

1. A swimsuit, comprising:

an outer bathing garment covering the female torso including the breasts;

an inner liner garment engirdling [the] *a* female loin, and joined along [the] *an* inner liner edge to [the] *a* border of the outer garment except along an upper edge just below the breasts;

breast supporting means secured to the inner liner, so that the breasts are thrust upwardly and forward against the outer garment to provide a natural appearance.

2. The swimsuit of claim 1 wherein the breast supporting means comprises arcuate stays secured to the upper edge of the inner liner and secured at each end only to the outer garment for hammocking the breasts.

3. A swimsuit, comprising:

an outer bathing garment covering the female loin and breasts;

an inner liner garment which engirdles the female loin, the inner liner joined along its perimeter to [the] *a* border of the outer garment, except along upper breast support edges;

a pair of breast-supporting stays secured to [the] *an* upper edge of the inner liner, secured also to the outer garment at each end only, for supporting the breasts and permitting a natural appearance.

4. A swimsuit as in claim 3 wherein the inner liner garment is smaller than the outer garment and is made from an elastic material with greater horizontal than vertical stretch.

5. A swimsuit as in claim 3 wherein the outer garment is of single ply construction.

6. A swimsuit, comprising:

an elastic outer bathing garment which covers the female torso, the outer garment having a padding-free front breast cover;

a form-fitting inner liner garment which engirdles [the] *a* female loin;

the inner liner being sewn along its edge to [the] *a* border of the outer garment, except along an upper breast-engaging perimeter;

a pair of arcuate breast-supporting stays secured to the upper perimeter of the inner liner and secured only at each end to the front breast cover of the outer garment, for supporting the breasts and permitting a natural appearance.

7. A swimsuit comprising:

a single ply elastic outer bathing garment which covers the female torso, the outer garment having a breast-cover front portion free from padding and a back portion which is joined to the front portion by a pair of adjustable shoulder straps;

a resilient form-fitting elastic inner liner garment, smaller in size than the outer garment, which engirdles [the] *a female* loin the inner liner having a lateral stretch which exceeds its vertical stretch and being sewn along its edge to [the] *a* border of the outer garment, except along an upper breastengaging perimeter; a pair of arcuate breast-supporting stays secured along their entire arc to the upper perimeter of the inner liner garment, by passage into a pair of sheaths formed at the upper perimeter of the inner liner, and fastened at each end to [the] *a* front portion of human breasts, thrusting the breasts upward and forward against the breast-covering front portion to provide a natural appearance.

8. The swimsuit of claims 1, 3, 6, or 7 in which said arcuate stays are in a sheath formed of material defining a cushioned region for contacting the underside of the breast.

*9. A swimsuit comprising:*

*an outer bathing garment covering a female loin and having a padding-free front breast cover;*

*an inner liner garment engirdling the female loin, and joined to a border of the outer garment; and*

*breast supporting means disposed above the inner liner garment in the region of the breast and secured to the inner liner garment, so that the breasts are thrust upwardly and forward toward the outer garment.*

*10. The swimsuit of claim 9 wherein the breast supporting means comprises stay means secured to the inner liner garment, said stay means having outer ends secured at each end to the outer garment for supporting the breasts.*

*11. The swimsuit of claim 10 in which said stay means is secured to said outer garment at each outer end only.*

*12. A swimsuit, comprising:*

*an outer bathing garment covering a female loin and breasts;*

*an inner liner garment engirdling the female loin and joined to a border of the outer garment; and*

*breast supporting stay means disposed above the inner liner garment in the region of the breasts and secured to the inner liner garment, said stay means having outer ends secured at each end to the outer garment for supporting the breasts.*

*13. The swimsuit of claim 12 in which said stay means is secured to said garment at each outer end only.*

*14. A swimsuit, comprising:* an outer bathing garment covering a female torso including the breasts;

*an inner liner garment engirdling at least the female loin, an outer perimeter of said inner liner garment being joined only to an outer perimeter of said outer garment; and*

*breast supporting means disposed above the inner liner garment in the region of the breasts and secured to the inner liner garment, said breast supporting means having outer ends secured to the outer garment at each said outer ends only.*

*15. A swimsuit comprising:*

*an outer bathing garment covering a female loin;*

*an inner liner garment engirdling the female loin, and joined to a border of the outer garment; and*

*breast supporting means disposed above the inner liner garment in the region of the breast and secured to the inner liner garment, so that the breasts are thrust upwardly and forward toward the outer garment.*

*16. The swimsuit of claim 9, 12, 14 or 15 in which said breast supporting means comprises material located entirely below the breast that is substantially thicker than adjacent material of said inner liner.*

*17. The swimsuit of claim 16 in which the inner liner garment is smaller than the outer garment.*

*18. The swimsuit of claim 9, 12, 14 or 15 in which the inner liner garment is smaller than the outer garment.*

* * * * *